(12) United States Patent
Jäger et al.

(10) Patent No.: US 7,850,570 B2
(45) Date of Patent: Dec. 14, 2010

(54) METHOD FOR DETERMINING THE APPLICATION POINT OF AN AUTOMATICALLY CONTROLLED FRICTION CLUTCH

(75) Inventors: Thomas Jäger, Meckenbeuren (DE); Roland Mair, Tettnang-Laimnau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 494 days.

(21) Appl. No.: 11/914,030

(22) PCT Filed: May 5, 2006

(86) PCT No.: PCT/EP2006/004205

§ 371 (c)(1),
(2), (4) Date: Nov. 9, 2007

(87) PCT Pub. No.: WO2006/119918

PCT Pub. Date: Nov. 16, 2006

(65) Prior Publication Data

US 2009/0131217 A1    May 21, 2009

(30) Foreign Application Priority Data

May 11, 2005   (DE) ................... 10 2005 021 711

(51) Int. Cl.
*B60W 10/10* (2006.01)
(52) U.S. Cl. .................. 477/77; 477/80; 477/175
(58) Field of Classification Search .............. 477/70, 477/73, 74, 79, 80, 175; 192/103 R, 111.12; 701/67

See application file for complete search history.

(56) References Cited

U.S. PATENT DOCUMENTS

| 5,065,851 | A | * | 11/1991 | Otsuka et al. | ........... 192/103 R |
| 5,176,234 | A | | 1/1993 | Reik et al. | |
| 5,393,274 | A | * | 2/1995 | Smedley | ..................... 477/74 |
| 6,481,554 | B1 | | 11/2002 | Ota et al. | |
| 7,474,950 | B2 | * | 1/2009 | Schwenger et al. | ........... 701/67 |

FOREIGN PATENT DOCUMENTS

| DE | 32 18 933 A1 | 11/1983 |
| DE | 199 51 527 C1 | 6/2001 |
| EP | 0 392 762 A2 | 10/1990 |
| EP | 0 550 993 A2 | 7/1993 |
| EP | 1 257 746 B1 | 11/2002 |
| WO | WO-98/28162 | 7/1998 |

* cited by examiner

*Primary Examiner*—Ha D. Ho
(74) *Attorney, Agent, or Firm*—Davis & Bujold, P.L.L.C.

(57) ABSTRACT

A method of determining an application point of an automatically actuated clutch of an automatic mechanical transmission. After pre-selecting a new gear, the clutch automatically separates, the activated gear disengages, the engine rotational speed is brought to a target value for the new gear and the clutch, with higher advancing speed, is advanced to an application point at which the transmission input shaft is precisely entrained. To determine the application point, the gradient of the time curve of the rotational speed of the transmission input shaft is monitored, an important change of the gradient, that adjusts itself when reaching the application point, is determined and the current position of the clutch is defined as the application point. The application point is determined during downshifts, the time rotational speed curve of the transmission input shaft is between slowdown and re-acceleration, which is easily and accurately determined.

7 Claims, 1 Drawing Sheet

METHOD FOR DETERMINING THE APPLICATION POINT OF AN AUTOMATICALLY CONTROLLED FRICTION CLUTCH

This application is a national stage completion of PCT/EP2006/004205 filed May 5, 2006, which claims priority from German Application Serial No. 10 2005 021 711.7 filed May 11, 2005.

FIELD OF THE INVENTION

This invention relates to a method for determining the application point of an automatically actuated friction clutch for a motor vehicle.

BACKGROUND OF THE INVENTION

The importance of automated mechanical transmissions will increase in the future. Compared to manually operated transmission, they offer a considerable increase in travel comfort and travel security at insignificant higher costs, inasmuch as they unburden the driver, but compared to conventional automatic transmissions they have clearly lower production costs and reduce small fuel consumption.

Important for the operation of automated mechanical transmissions is the automatic control of clutch actuation and the knowledge, necessary for this purpose, regarding the application point of the clutch in all operating conditions, such as elevated temperatures, deteriorated clutch linings, etc. The application point is designated as the position of the clutch at which the transmission of torque from the engine to the transmission input shaft, begins.

In automated mechanical transmissions, the driver or a control device for shifting the transmission pre-selects the next gear whereupon the specific shifting operation automatically start. To keep the whole shifting time as short as possible, a pure dead time in which the clutch approaches the application point, i.e., to carry out this approach as quickly as possible, the motion of the clutch that follows this in an engaging direction progresses under control and in a manner such that the shifting operation can be carried out at a shifting rotational speed of the transmission input shaft.

Already known from EP 0 392 762 B1 is a method for determining the application point of an automatically actuated friction clutch of a mechanical transmission for a motor vehicle in which the idling rotational speed of the engine is monitored and used for determining the application point. With the first engagement of the clutch, the engine rotational speed slows down as consequence of the resistance from starting a stationary transmission. In this significant drop of the idling rotational speed of the engine at the start of the clutch engagement, conclusion is reached as to the application point. It is disadvantageous for detecting the application point with certainty that a relatively great torque has to appear. In the engine this leads, as a rule, to an interruption in rotational speed that the driver feels as disturbing. Another disadvantage of the known method is seen in that it can only be used together with a transmission having a conventional synchronization device at its disposal, since synchronization, via a rotational speed control of the engine, does not result.

WO 98/28162 A1 or EP 0 883 509 B1 discloses a method in which the engine rotational speed is likewise monitored and used for determining the application point of a clutch. This known method uses a downshift operation. At the same time, after disengaging of the clutch and disengagement of the higher gear by engaging the lower gear, the transmission input shaft is brought to a higher rotational speed. When disengaging the clutch, the engine is consequentially accelerated to the higher rotational speed. During this important rotational speed increase, conclusion is reached as to the application point. This method also can only be used in combination with a transmission having conventional synchronization device, since synchronization does not result by an active rotational speed control of the engine.

With this background the problem on which the invention is based is to create a method, which allows to reliably and accurately to determine the application point of the clutch and which makes an active synchronization possible by control of the rotational speed of the engine.

SUMMARY OF THE INVENTION

The invention is based on the knowledge that in an active synchronization in which the engine is rotational speed is adjusted to a target speed for the new gear, during application of the clutch, the rotational speed of the input shaft of the idling and slowing transmission is significantly changed such that the change of rotational speed is adequate for reliably determining the application point.

Accordingly, the invention departs from a method for determining a point of engagement of an automatically actuated friction clutch of an automated mechanical transmission for a motor vehicle wherein, after pre-selecting a new gear, the clutch is disengaged; the activated gear is disengaged; the rotational speed of the engine is adjusted to a target speed for the new gear, and the clutch is biased up to an application point, at which the input shaft of the transmission is precisely driven along. In the further curve of the shifting process, in a manner known per se, the rotational speed of the transmission input shaft driven by the clutch is adjusted to the shifting rotational speed required for engaging the new gear.

To solve the stated problem, it is provided that the gradient of the momentary curve of the rotational speed of the transmission input shaft be monitored, a self-adjusting significant change of the gradient be determined when reaching the application point and the position of the clutch at this moment is defined as application point.

This method can be basically used in upshifts and downshifts, but when downshifting, especially favorable conditions exist for determining the application point as explained in detail with the aid of an embodiment.

It is true that DE 199 51 527 C1 has disclosed a method where the engine, when the gear is disengaged, is adjusted to a target speed for the next gear, the clutch is disengaged and the rotational speed of the transmission input shaft is monitored to determine a so-called point of contact. But this point of contact is not the point of application of the clutch as defined above. The point of contact is rather regarded as the point or the clutch position at which the transmission input shaft has reached a shifting rotational speed required for activating the new gear. But in the curve of the shifting process, this clutch position is reached after the application position, and therefore being unsuitable as application position unless a quick advancement of the clutch takes place.

As has been stated before, according to a preferred embodiment of the invention, the application point is determined during a downshifting operation, the application point being defined as a gradient value G=0 between the slowdown of the transmission input shaft and the re-acceleration thereof to a higher rotational speed for the lower gear.

In a gradient G=0, the rotational speed of the transmission input shaft has a minimum, i.e., the gradient changes from a negative value to a positive value. This distinct rotational speed minimum can be reliably and easily detected.

According to another development of the invention, the application point can also be determined during an upshift operation since, in this case, the rotational speed of the transmission input shaft is, in general, significantly changed when the clutch is applied. That is the rotational speed curve will show at least one sharp bend. In this case, to make sure that the rotational speed curve can be reliably determined, it is provided during an upshift operation, that there is an expected slowdown of the transmission input shaft to a rotational speed below the shifting rotational speed for the higher gear so that an increase in rotational speed occurs here when applying the clutch, that is, a sign reversal of the gradient appears and thus it is reliably possible to determine the application point.

In order that the determination of the application point, according to the above described method, delivered to the dynamic behavior of the actuators, etc., are sufficiently accurate, in addition to taking into account signal delays, it is important to make the engaging operation of the clutch comparatively slow. This then, of course, results in the shifting time, due to the active synchronization, by way of control of the engine rotational speed, being longer than when using synchronization devices adequate for the transmission. Therefore, according to one other development of the invention, it is provided that the application point be determined momentarily during the shifting operation which allows a long shifting time without noticeable effect on the comfort, like in thrust downshift operations, shifting operations while the motor vehicle coasts and the like.

It is further provided that the advancement of the clutch, out of the application position reached in the terminal engaging position, be extended by a time interval while taking into account the pre-defined reaction characteristics of the components participating in the shifting operation, that is, the above mentioned signal delays, the dynamic behavior of the actuators, etc.

The application point of the clutch can always be repeatedly determined while driving by following changing conditions. The conditions being those that are specifically affected by the temperature and the current load state. Together with the influences of a sensor drive of clutch path can be at least partly compensated, the position application point being determined at any time independently of the output signal of a clutch path sensor belonging thereto.

The application point can be determined and stored at pre-determined time intervals or shifting operation intervals or during each of the shifting operations provided for determination thereof. Besides, different application points can be determined and stored for different comparable shifting operations.

BRIEF DESCRIPTION OF THE DRAWING

The invention will now be described, by way of example, with reference to the accompanying drawing in which.

DETAILED DESCRIPTION OF THE INVENTION

Figure 1:
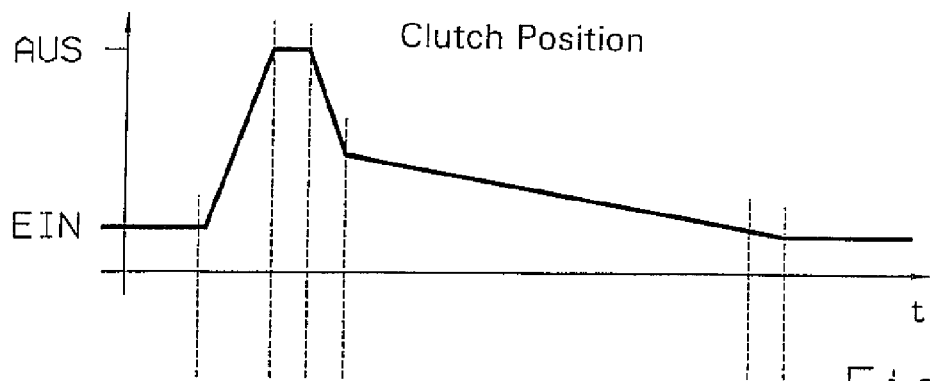
FIG. 1 diagrammatically and purely qualitatively show the time curve of the clutch position during a shifting operation.
Figure 2:
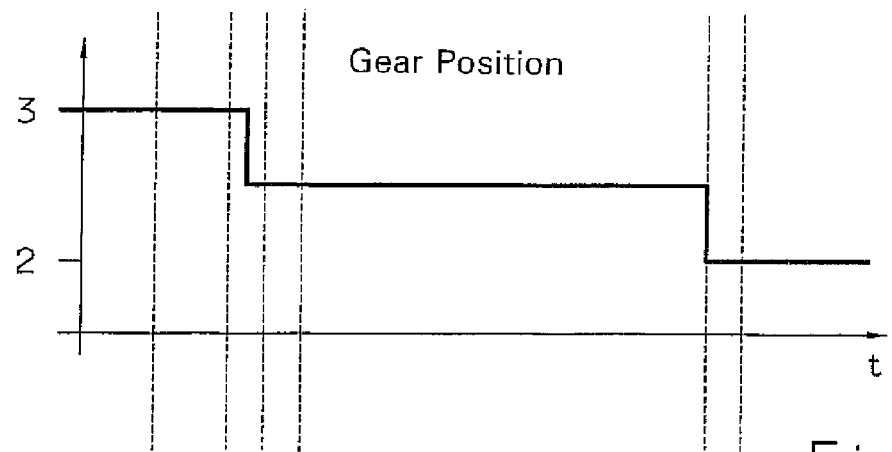
FIG. 2 is a curve of the gear position over time.
Figure 3:
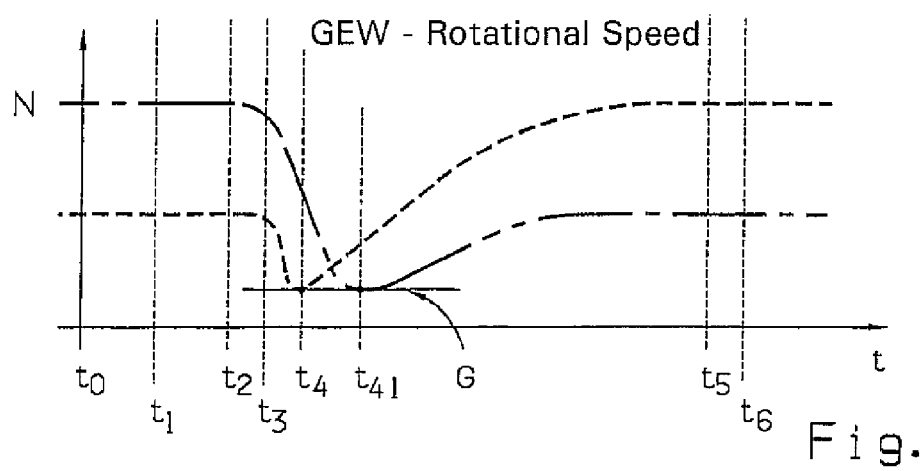
FIG. 3 is a curve of the rotational speed of the transmission input shaft over time.

FIGS. 1 to 3 show a downshift operation during which a third gear is downshifted to a second gear. After at the moment to the driver has adjusted a gear shifting lever from a position of the third gear to a position of the second gear, thus pre-selecting the second gear or a control device has released it, at a moment $t_1$ the clutch starts moving from the IN position to the OUT position which is reached at a moment $t_2$. At the same time, the driver is deprived of the possibility of control of the engine rotational speed via the acceleration pedal. When the clutch is disengaged, no more torque is transmitted. In the short time interval between $t_2$ and $t_3$ during which the clutch is completely disengaged, the third gear is engaged so that the transmission is in an idling running position. Further the actuator of the transmission, for example, disengages the gear and a gate actuator of the transmission controls a transmission gate belonging to a target gear in case this is not already present.

After disengagement of the third gear, that is, in a time interval between $t_3$ and $t_4$, a rotational speed N of the transmission input shaft drops as a consequence of the inner drag resistance of the transmission. In the same time interval, the clutch is adjusted with a quick advancing motion to the application point which is reached at the moment $t_4$.

In the time interval between $t_3$ and $t_6$, the clutch in a controlled manner, generally with a slower advancing speed, further advances and accelerates the transmission input shaft brought along with the clutch.

At a preset moment $t_5$, the transmission input shaft has reached a shifting rotational speed, at which the second gear can be activated by the gear actuator. Since a downshift operation is involved here, the shifting rotational speed at the moment $t_5$ is above, shown as a rotational speed GEW, the rotational speed of the transmission input shaft at the moment $t_0$.

Between the moments $t_5$ and $t_6$, the clutch is moved to its final disengaged position which is reached at the moment $t_6$. At this moment $t_6$, the driver is again able to control the engine torque via the accelerator pedal.

As is specially to be understood from FIG. 3, the rotational speed curve of the transmission input shaft at the moment $t_4$, at which the application point has been reached, has a distinct minimum with horizontal tangent (gradient G=0). The moment $t_4$ can easily be very accurately detected such that the application point can also be very precisely determined.

In FIG. 3 is plotted as dotted line, is a possible rotational speed curve of the transmission input shaft for the case of an upshift from the second gear to the third gear. In this case, the transmission is allowed to slow down so that the rotational speed of the transmission input shaft is below its target rotational speed for the third gear and thus also, in this case, there again generates a distinct minimum at a moment $t_{41}$ which is defined as the application point.

The invention claimed is:

1. A method for determining an application point of an automatically actuated friction clutch of an automated mechanical transmission of a motor vehicle, which, when shifting gear ratios, a new gear is pre-selected, the friction clutch automatically disengages, an activated gear disengages, a rotational speed of an engine is adjusted to a target value for the new gear and the friction clutch is advanced, prior to and continuously after the application point, such that a transmission input shaft is precisely entrained to bring a rotational speed of the transmission input shaft to a shifting rotational speed required for engaging the new gear, the method comprising the steps of:

observing a gradient (G) of the transmission input shaft rotational speed curve over time;

detecting a time at which a significant change in the gradient (G) occurs, wherein the significant change in the gradient (G) is a change from a negative value to a positive value;

determining a position of the friction clutch at the time (t4, t41) at which the significant change in the gradient (G) occurs; and defining this position of the friction clutch as the application point.

2. The method according to claim 1, further comprising the steps of:

observing the gradient (G) of the transmission input shaft rotational speed curve over time during a downshift between an activated gear and the new gear; and determining the position of the friction clutch at the time (t4, t41) at which the gradient (G) of the transmission input shaft rotational speed curve over time is equal to zero.

3. The method according to claim 1, further comprising the steps of determining the position of the friction clutch and defining the application point of the clutch during an up-shift from an activated gear to the new gear such that the rotational speed of the transmission input shaft slows from a rotational speed of an activated gear to a slower rotational speed of the new higher gear.

4. The method according to claim 1, further comprising the steps of determining the position of the friction clutch and defining the application point of the clutch during one of a thrust downshift operation and a shifting operation, while the motor vehicle is coasting, which lengthens shifting time.

5. The method according to claim 1, further comprising the steps of extending the time interval over which the friction clutch advances, from the application position to the engaged position, to account for at least one of signal delays, dynamic behavior of actuators and characteristics of components participating in shifting the gear ratios.

6. The method according to claim 1, further comprising the steps of determining and storing the application point in one of predetermined time intervals and shifting operation intervals and during shifting operations provided for determination thereof.

7. The method according to claim 6, further comprising the steps of determining and storing different application points for different intrinsically comparable shifting operations.

\* \* \* \* \*